United States Patent [19]
Yuhara et al.

[11] Patent Number: 5,382,777
[45] Date of Patent: Jan. 17, 1995

[54] AUTOMATED TELLER MACHINE

[75] Inventors: Tazunu Yuhara; Hiroya Onimaru, both of Owariasahi; Kanzen Gotou, Aichi; Ikuyo Oda, Owariasahi, all of Japan

[73] Assignee: Hitachi, Ltd., Tokyo, Japan

[21] Appl. No.: 850,526

[22] Filed: Mar. 13, 1992

[30] Foreign Application Priority Data

Mar. 13, 1991 [JP] Japan .................... 3-073820

[51] Int. Cl.$^6$ .................... G06F 3/00; G06F 15/30
[52] U.S. Cl. .................... 235/379; 364/709.08; 902/20
[58] Field of Search .................... 235/379; 902/20; 364/709.08, 709.11; 382/13, 59; 341/20, 33, 34

[56] References Cited

U.S. PATENT DOCUMENTS

| | | | |
|---|---|---|---|
| 4,608,485 | 8/1986 | Miura | 902/20 |
| 4,641,239 | 2/1987 | Takesako | 235/380 |
| 4,804,830 | 2/1989 | Miyagisima | 235/379 |
| 4,833,312 | 5/1989 | Minematsu et al. | 235/380 |
| 5,021,640 | 6/1991 | Muroi | 235/383 |
| 5,157,737 | 10/1992 | Sklarew | 382/13 |
| 5,185,515 | 2/1993 | Nishibe et al. | 235/379 |

*Primary Examiner*—E. Rollins Cross
*Assistant Examiner*—Erick Solis
*Attorney, Agent, or Firm*—Antonelli, Terry, Stout & Kraus

[57] ABSTRACT

An automated teller machine provided with a plurality of input means and a corresponding method for conducting transactions using this machine. In the machine, a touch sensor for producing a signal when a user touches a previously registered area with a finger and a character recognition sensor for recognizing characters drawn on another previously registered area are superposed on a display. The sensor to be operated is selected in accordance with input data, the kind of transaction and/or user's preference. Thus, the data can be input in a manner which provides the easiest and most efficient mode of use for the user.

9 Claims, 9 Drawing Sheets

TRANSPARENT TABLET: ELECTROSTATIC INDUCTION SYSTEM
LIQUID CRYSTAL PANEL: STANDARD TYPE

FIG. 2B
PRIOR ART

TABLET: ELECTROMAGNETIC INDUCTION TYPE
LIQUID CRYSTAL: GLASS ON CHIP TYPE

FIG. 2C
PRIOR ART

TABLET: PIEZO-ELECTRIC TYPE
LIQUID CRYSTAL: STANDARD TYPE

| FINANCIAL INSTITUTION | BRANCH NAME | KIND OF DEPOSIT |
|---|---|---|
| BANK | BRANCH | |
| CODE NUMBER | PAYMENT DESTINATION NAME | |
| | | |
| USER'S NAME | USER'S TELEPHONE NUMBER | |
| | | |

PLEASE INSERT THE FOLLOWING ITEMS USING PEN

AUTOMATED TELLER MACHINE

BACKGROUND OF THE INVENTION

1. Field of the Invention

The present invention relates to an automated teller machine (ATM) and an inputting method using this machine, and more particularly to an automated teller machine provided with plural input devices which are directly operated by users.

2. Description of the Related Art

One of the related arts is disclosed in JP-A-2-81171. The technique disclosed is such that in an apparatus provided with a touch sensor and a keyboard, and if either one of the touch sensor and keyboard serving as inputting ports does not work normally, the inputting port having trouble is separated and data is input from only the other available input port so that the phenomenon 'system-down' is prevented.

The ATM provided with an input device having a character recognition function has also been widely adopted.

However, the ATM having both the above touch sensor or the keyboard and the input device having a function of character recognition (hereinafter referred to as character inputting device) is not known yet.

SUMMARY OF THE INVENTION

The first object of the present invention is to provide an ATM provided with a touch sensor and a character inputting device.

The second object of the present invention is to provide an ATM which can be easily operated by users.

The third object of the present invention is to provide an ATM having a simple structure.

In order to attain at least one of the above objects, in accordance with the present invention, the panels of the touch sensor and the character inputting device are superposed on a display device and either one is selectively operated.

Such an ATM is provided with the character inputting device which can recognize symbol characters and other icon-related data, icon data other than numerals and letters, which can be easily input as well. On the other hand, in order to input transaction content, date, amount of money, identification number of a user, etc., it is more convenient to use numerals and letter symbols rather than icons or character symbols. The present invention, therefore, is constructed so that the inputting device which provides easier and more efficient use than the other can be selected in accordance with the data to be input. Since users may have different preferences, the present invention is also constructed so that an individual user can select the inputting device preferable for himself. Further, the touch sensor and the character recognition device are superposed on a display device to simplify the structure of the ATM according to the present invention.

The above and other objects and features of the present invention will be more apparent from the following description taken in conjunction with the accompanying drawings.

DESCRIPTION OF THE PREFERRED EMBODIMENTS

Now referring to the drawings, embodiments of the present invention will be explained below.

Figure 1:
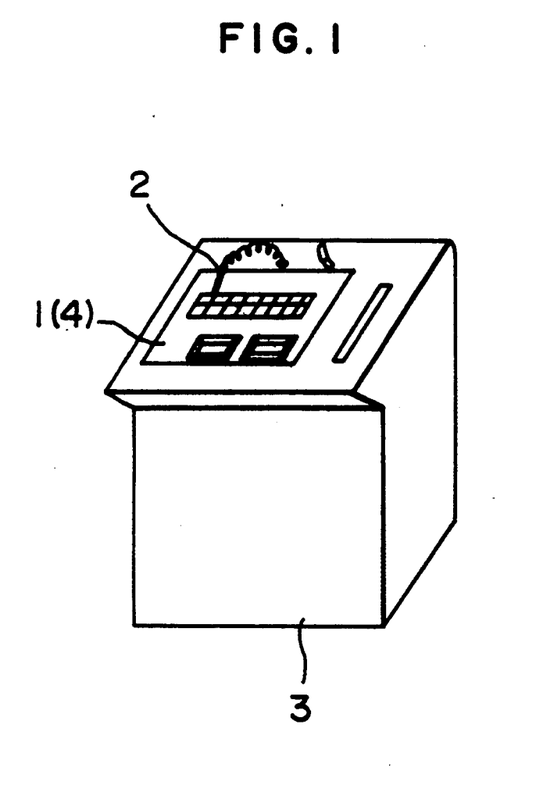
FIG. 1 is a perspective view showing the terminal unit of an ATM.

FIG. 1 is a perspective view of the terminal unit of an ATM. This terminal unit comprises a display device 1, a pen 2, a control unit 3, and a sensor unit 4.

The display device 1 serves to display a predetermined guidance, symbol keys, a series of letters, etc. The display device 1 is a CRT (cathode ray tube) or LCD (liquid crystal display) the displayed contents of which are controlled by a control unit 3.

The sensor unit 4 is rested on the display device 1. The sensor unit has a composite structure consisting of a touch sensor which can recognize touching by a user and a sensor for character recognition which can recognize written characters.

Figure 2A:
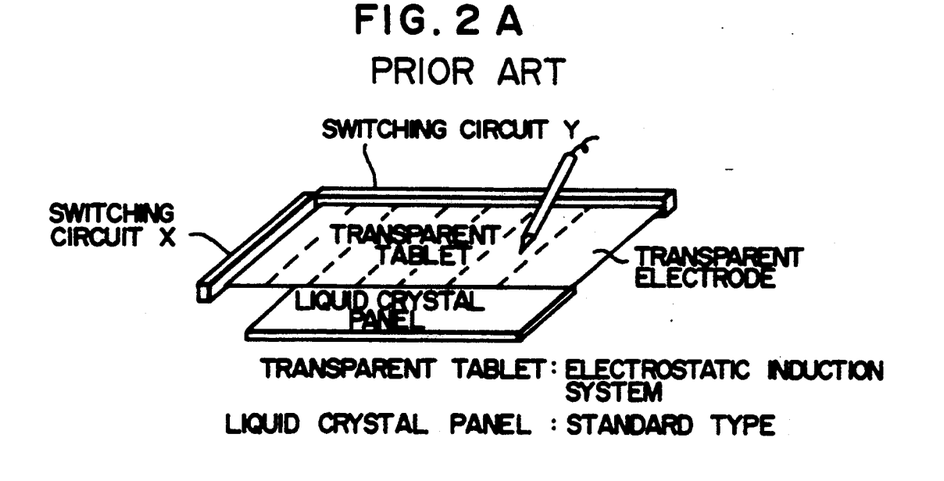
FIGS. 2A to 2C are views showing various arrangements of a sensor for character recognition.
Figure 2B:
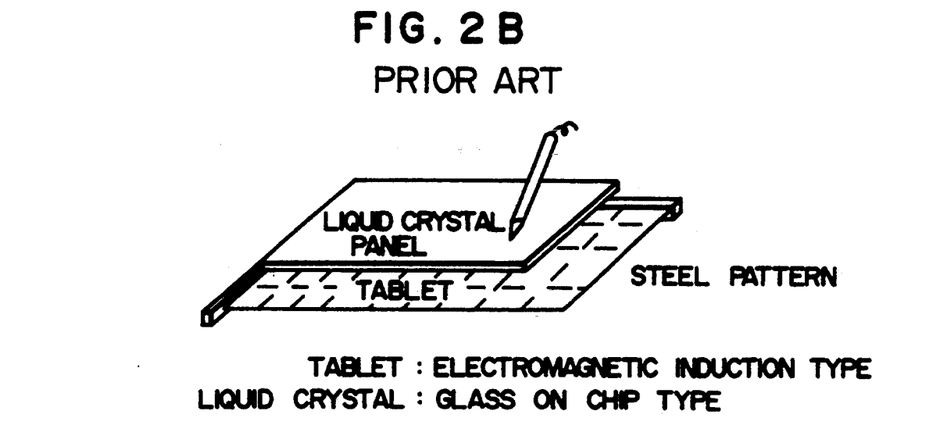
Figure 2C:
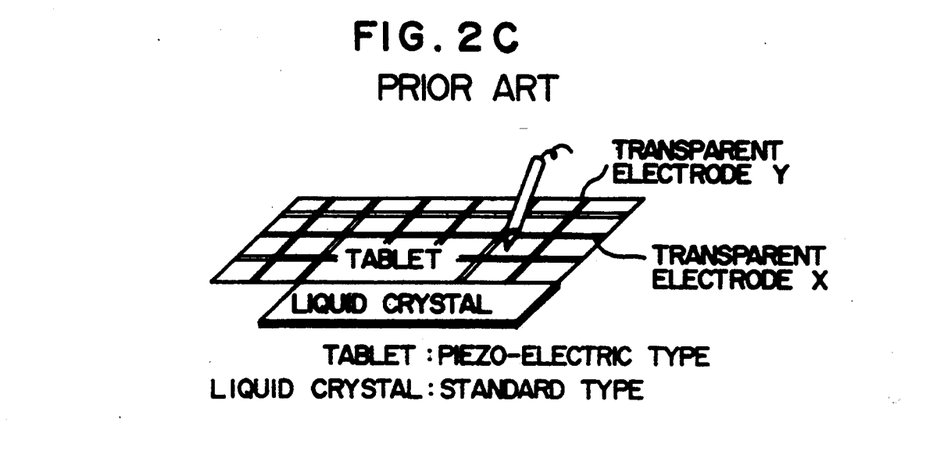

Several kinds of character recognition sensors are shown in FIGS. 2A to 2C. Specifically, FIG. 2A shows a composite structure of a transparent tablet and a liquid crystal display in which, when a voltage is applied to the transparent electrodes, a voltage change across the electrodes due to the tablet (capacitor) is sensed. FIG. 2B shows a composite structure of an electromagnetic tablet and a liquid crystal display in which a high frequency electromagnetic wave is emitted from the tablet and the voltage change across the electrodes is due to the electromagnetic wave. FIG. 2C shows a composite structure of a piezo-electric tablet and a liquid crystal display which senses a current flowing when stress is applied by the tablet so that an X-electrode and Y-electrode are brought into contact.

Figure 3A:
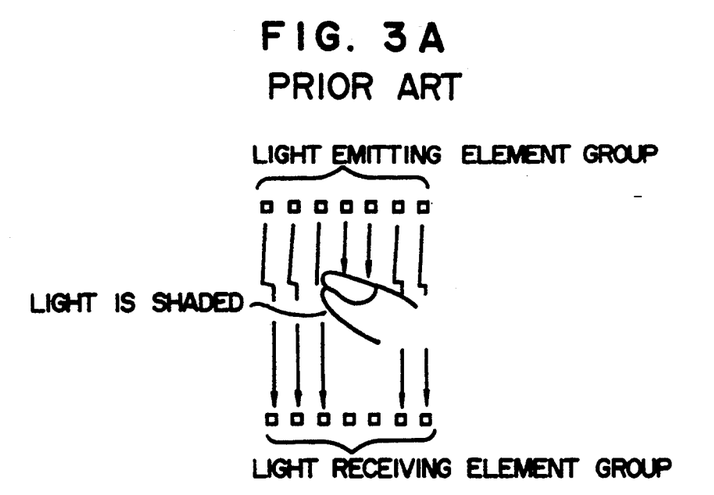
FIGS. 3A to 3C are views showing various arrangements of a touch sensor.
Figure 3B:
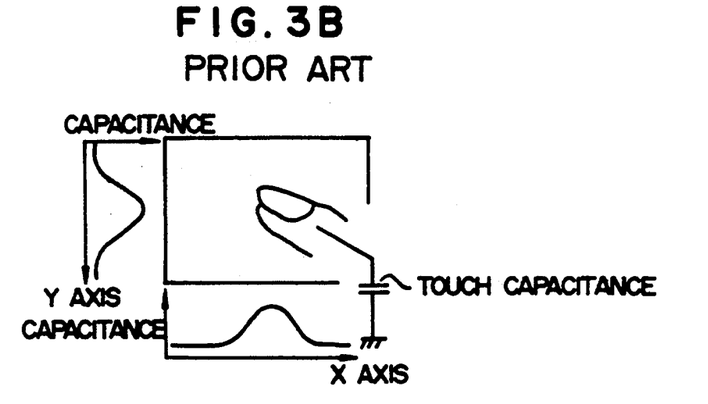
Figure 3C:
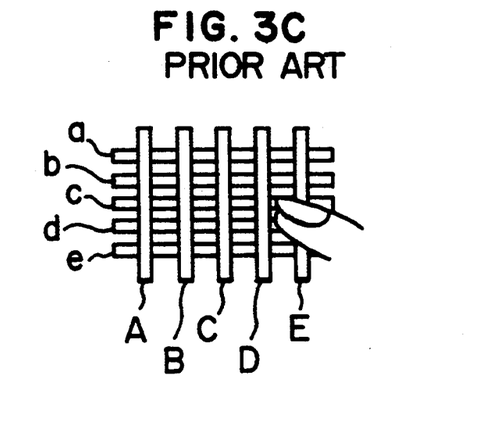

Several kinds of touch sensors are shown in FIGS. 3A to 3C. Specifically, FIG. 3A shows an optical sensor in which optical switches consisting of a group of light emitting elements and a group of light receiving elements are arranged along the edges of a display in a matrix shape so that a light shading position is sensed. FIG. 3B shows an electrostatic capacitance sensor which senses a change in the capacitance due to touching by an operator's finger. FIG. 3C shows a sensor of X-Y matrix electrodes which senses the current flowing when stress is applied by the tablet so that an X-electrode and Y-electrode are brought into contact.

The above character recognition sensors and touch sensors have been widely used.

Figure 4:
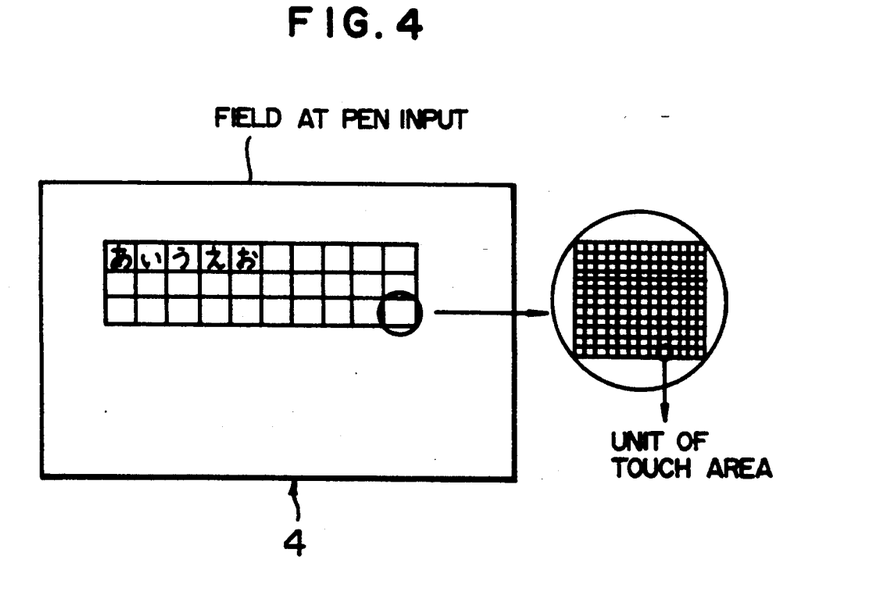
FIG. 4 is a view showing a field of character recognition mode and a unit of a sensible capacitance change.

In this embodiment, the composite sensor unit 4 consists of two sensors rested on the display. Specifically, the character recognition sensor shown in FIG. 2A and the touch sensor shown in FIG. 3B are combined. Since these sensors operate on the same operating principle, the transparent tablet which occupies the main part of the sensor unit 4 can be commonly used. If this transparent tablet is to be used as a touch sensor, a predetermined area of the tablet is previously registered in accordance with the contents to be displayed on the display. Such an area can be registered by a main control unit 21 and a storage unit 28 shown in FIG. 6. In a touch sensor mode, when a user's finger touches the above registered area, the sensor unit 4 generates a signal corresponding to the contents displayed on the display. On the other hand, in a character recognition mode, when characters are drawn on the previously registered, the main control unit 21 recognizes them. The concrete manner of recognition is disclosed in e.g., Mozininshiki Gairon (General Consideration of character recognition), Shinichiro Hashimoto et al., The Telecommunication Association, pp 126–135. The unit of a sensible capacitance change in the tablet is set to be approximately equal to the size of the tip of the pen 2 (see FIG. 4) so that the characters inputted can be surely recognized.

Additionally, the main control unit 21 also serves to switch the touch sensor mode to the character recognition mode and vice versa. The reference signal or data for switching will be described later.

Figure 5:
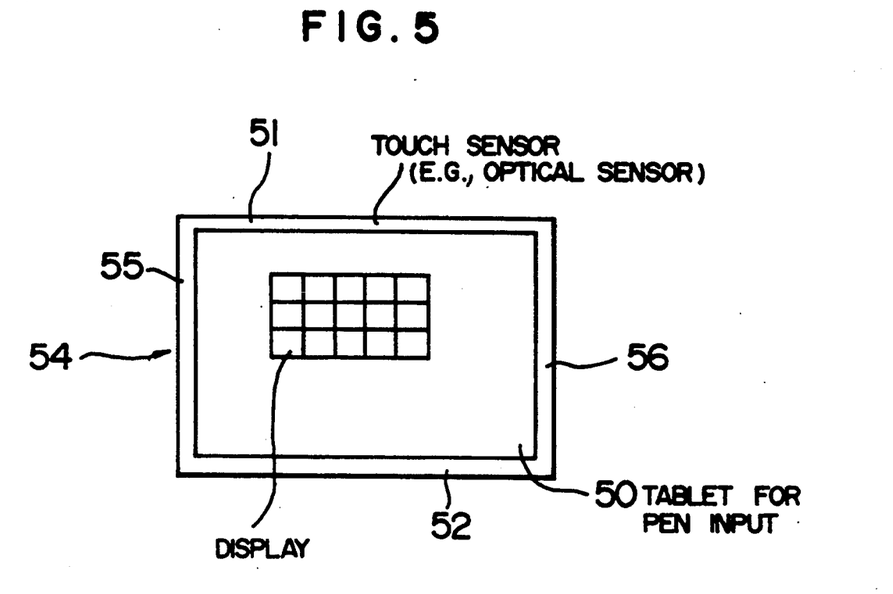
FIG. 5 is a view showing a combination of a character recognition sensor and a touch sensor based on different principles.

FIG. 5 shows a composite sensor unit 54 consisting of the character recognition sensor shown in FIG. 2A and the touch sensor shown in FIG. 3A. Specifically, as seen from FIG. 5, a group of light emitting elements 51, 55 and a group of light receiving 52, 56 are arranged around a tablet 50 for pen input.

Figure 6:
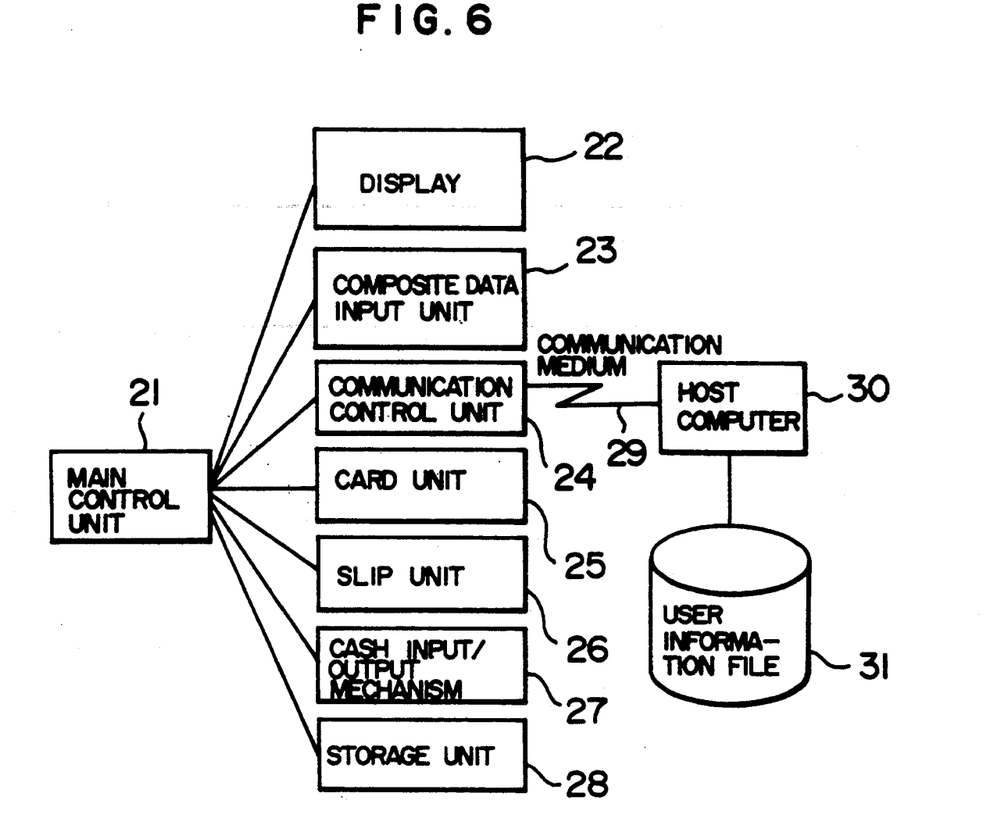
FIG. 6 is a block diagram of an ATM according to one embodiment of the present invention.

FIG. 6 shows the arrangement of an ATM according to one embodiment of the present invention. In FIG. 6, 21 denotes a main control unit for controlling an ATM and is placed within the control unit 3 (see FIG. 1); 22 denotes a display which is, for example a liquid crystal panel; 23 denotes a composite data inputting unit having the sensor 4 described above as a main component; 24 denotes a communication control unit; 25 denotes a card unit; 26 denotes a slip unit; 27 denotes a cash inlet/outlet mechanism; 28 denotes a storage unit; 29 denotes a communication medium; 30 denotes a host computer; and 31 denotes a user information file placed in the host processing unit. Generally, these components are the same as those conventionally employed. Some of them will be explained below as required.

Figure 7:
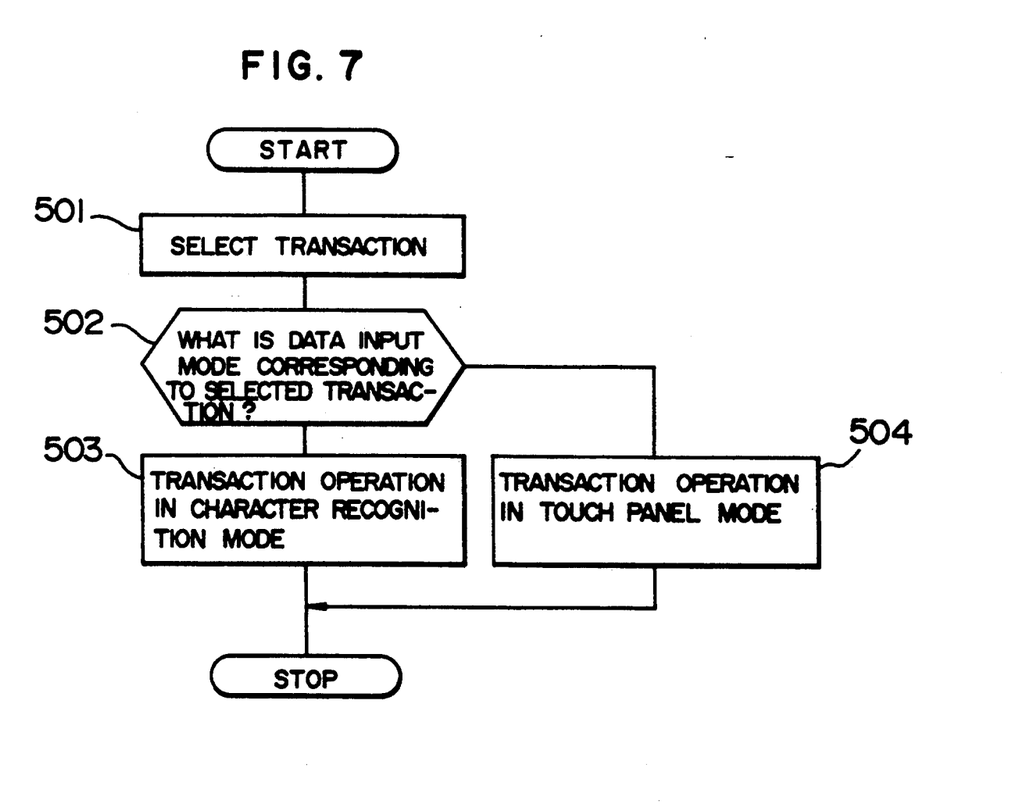
FIG. 7 is a flowchart of the operation in the embodiment shown in FIG. 6.

FIG. 7 shows the operation of the ATM according to this embodiment in a flowchart. First, in step 501, using the composite data input unit 23, now in the touch sensor mode, a user selects the transaction which he intends to perform from the transaction selection field displayed on the display 22. In step 502, the main control unit 21 refers to the corresponding table (FIG. 8) stored in the storage unit 28 to specify the data inputting mode on the basis of the transaction selected by the user so that the sensor in the mode is placed 'ON'. Thus, the user will be able to perform the transaction in the data inputting mode suitable for the selected transaction (steps 503 and 504).

Figure 8:
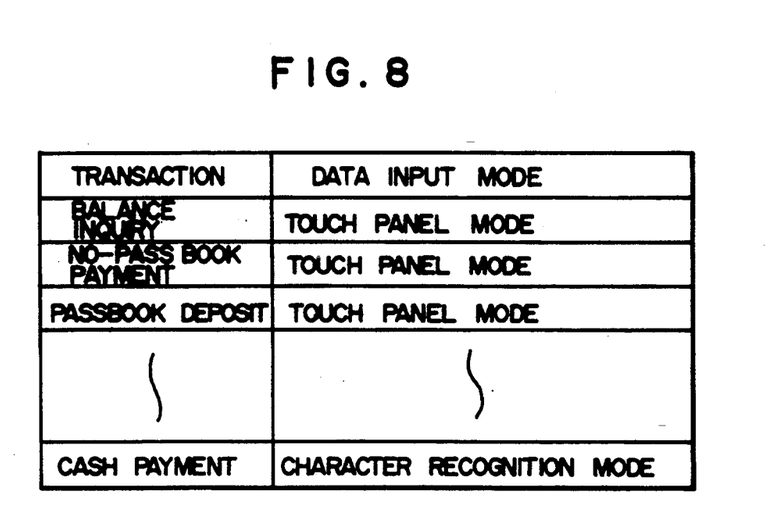
FIG. 8 is a table showing the correspondence between a transaction type and the input mode suitable therefor.

In accordance with this embodiment, the user can subjectively choose the data inputting mode suitable for the selected transaction on the basis of the corresponding relationships shown in FIG. 8.

Incidentally, the above correspondence table can be placed in the file 31 of the host computer 30 so that it can be referred to through host communication with the host processing unit 30. In other words, with a card storing information relative to the data inputting mode suitable for each of the transactions, the user may use the card to start the transaction in a suitable data inputting mode automatically selected. Otherwise, the user himself can select the data inputting mode suitable for the transaction which he intends to perform.

Now referring to FIGS. 6 and 9, the ATM according to another embodiment of the present invention will be explained below. In this embodiment, the data inputting mode suitable for a user's easy handling is previously stored in the file 31 of the host computer 30 so that any individual user can perform the operation for a transaction in the stored data inputting mode.

Figure 9:
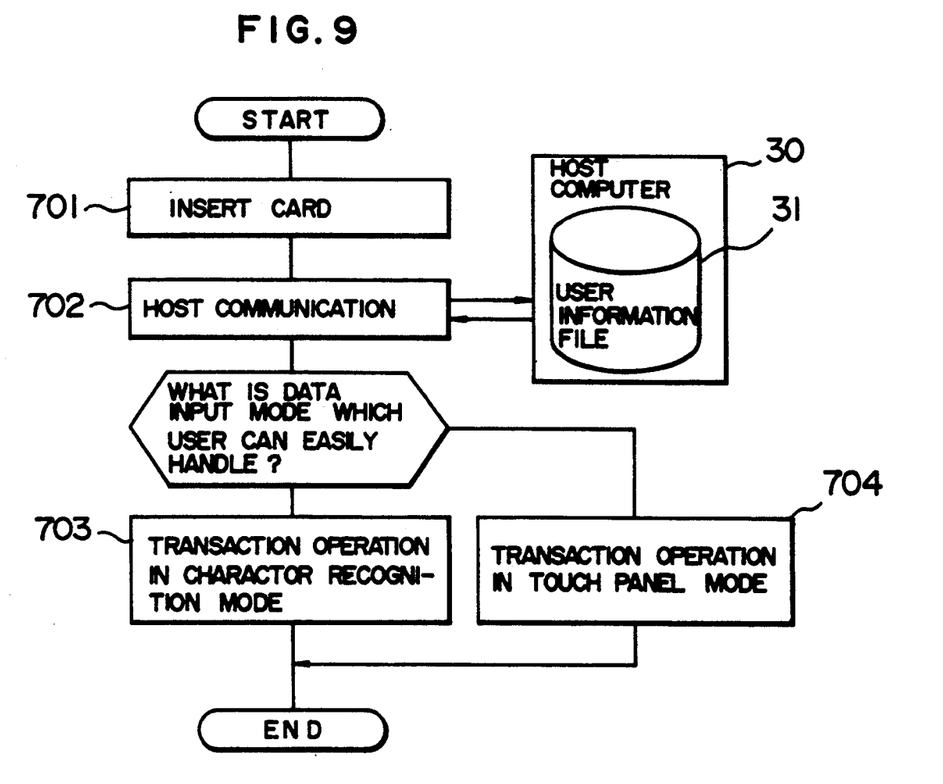
FIG. 9 is a flowchart showing the operation of another embodiment of the present invention.

FIG. 9 shows an operation flow when a user performs a transaction in accordance with this embodiment using the ATM as shown in FIG. 6

In FIG. 9, first, in step 701, the user inserts his card into the card unit 25 which reads the data stored in the card. In step 702, host communication is carried out. Specifically, the main control unit 21 transfers the read data to the communication control unit 24 which sends the data to the host computer 30. On the basis of the data sent from the terminal unit side, the host computer 30 retrieves the specific user information file, takes out from the user information file 31 the data inputting mode which the specific user can easily and preferably handle and sends it back to the communication control Unit 24 through the communication medium 29. It should be noted that the user information file 31 includes a table representative of the relationships between users and the corresponding data inputting modes.

On the data sent from the host computer side, the main control unit 21 displays on the display 22 the data inputting mode which the user can easily and preferably handle so that the user is guided into the data inputting mode. Then, the user performs the transaction operation in the data inputting mode guided (steps 703 and 704).

In accordance with this embodiment, the data inputting mode which an individual user can easily handle can be specified so that he is efficiently guided into the data inputting mode preferable for him.

The above user information file can be placed in the terminal unit to perform the same function as described above. In other words, with a card previously storing the data inputting mode which the user can easily handle, he may use the card to start the transaction in a desired data inputting mode read by the main control unit 21. Otherwise, the user himself can select the data inputting mode which he can easily handle.

Now referring to FIGS. 6, 10 and 11, the ATM according to still another embodiment of the present invention will be explained below. Taking 'cash payment' as a transaction example, FIG. 10 shows an operation flow when a user performs a transaction in accordance with this embodiment using the ATM as shown in FIG. 6.

Figure 10:
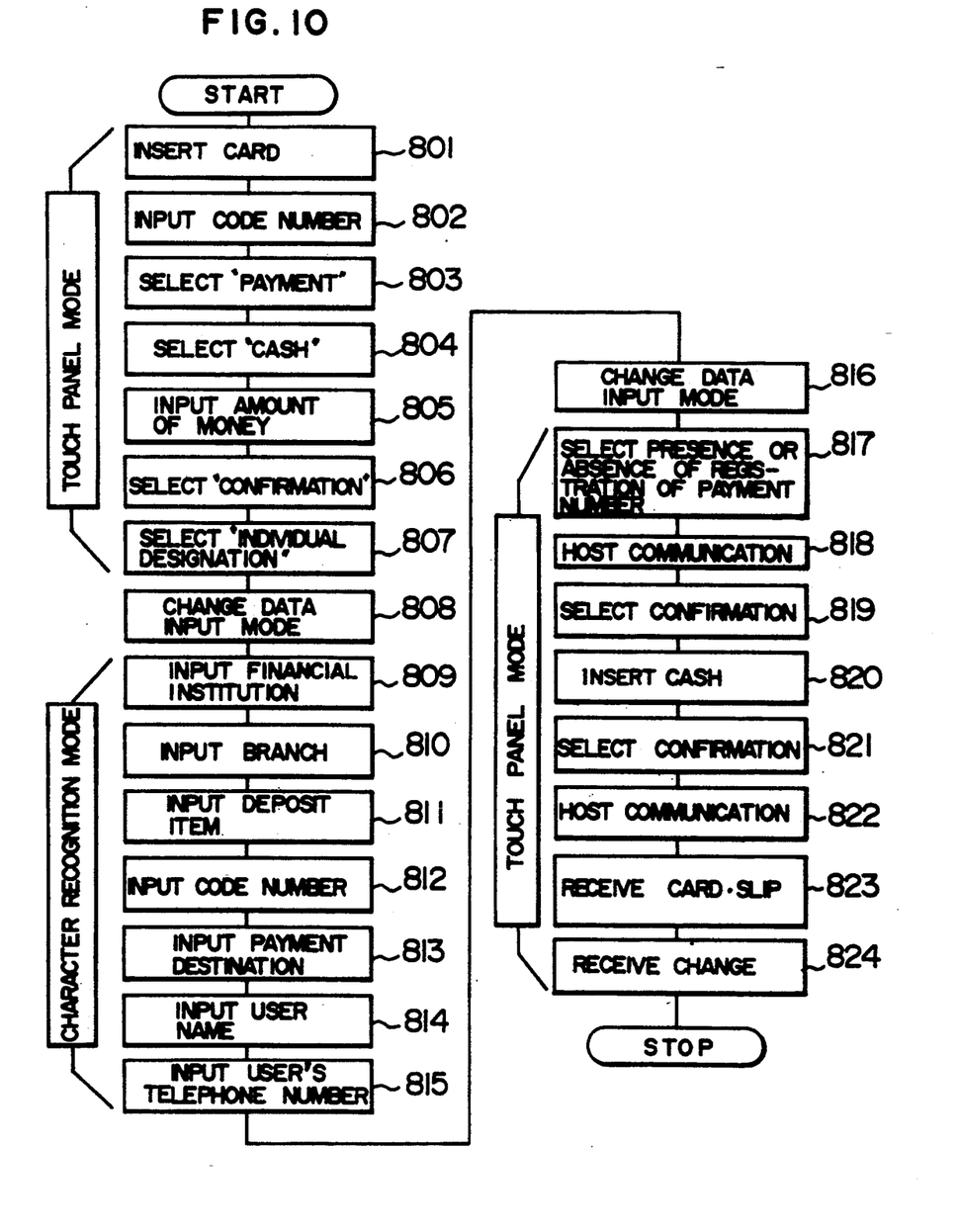
FIG. 10 is a flowchart showing the operation of another embodiment of the present invention.

In FIG. 10, first, in step 801, a user inserts his card into the card unit 25 in accordance with the guidance field displayed on the display 22. In step 802, the user inputs his code number in the touch panel mode using the composite data inputting unit 23. Likewise, in step 803, the user selects an item of 'payment' from a plurality of transactions displayed on the display 22. Further, likewise, in step 804, the user selects an item of 'cash' representative of cash payment of the payment transactions. In step 805, the user further inputs an amount of money which is to be paid to a payment destination. If it has been recognized that the amount of money input is correct, in step 806, the user selects an item of 'confirmation' in the touch panel mode. Further, in step 807, the user can select an item of 'individual designation' to input information such as the payment destination.

In step 808, the main control unit 21 switches the data inputting mode from the touch panel mode to the character recognition mode to display the guidance representative of the contents of the character recognition mode on the display 22 so that the user is urged to continue an input operation in the character recognition mode. Then, using the pen 2, the user inputs a financial institution, its branch office, the kind of deposit, a code number, a payment destination, the user's name and the telephone number of the user (steps 809 to 815).

Figure 11:
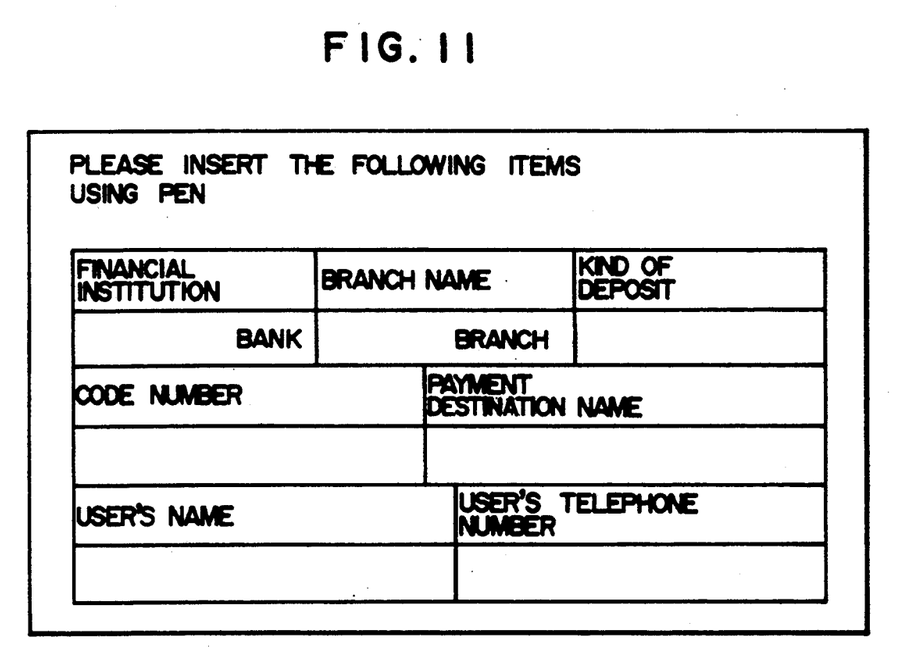
FIG. 11 is a view showing the contents displayed in a character recognition mode.

FIG. 11 shows the contents displayed on the display 22 in the character recognition mode. Specifically, the above items of the financial institution, its branch office, the kind of deposition, the code number, the payment destination, the user's name and the telephone number of the user are displayed on the display 22. The areas of the transparent tablet corresponding to the blanks under these items are previously registered.

Referring again to, in FIG. 10, in step 816, the main control unit 21 switches the data inputting mode from the character recognition mode back to the touch panel mode. In step 817, the user inputs the presence or absence of registration of a payment number in the touch panel mode. In step 818, host communication is carried out. Specifically, the main control unit 21 sends the input data to the communication control unit 24 which will transfer it to the host computer 30 through the communication medium 29. In step 819, if the user confirms that the input data are correct, he selects the item of 'confirmation' in the touch panel mode.

After the above operation, in step 820, the user inserts into the cash inlet/outlet mechanism 27 the cash which is paid to the payment destination. In step 821, the user, if he recognizes that the amount of money displayed is correct, selects the item of 'confirmation' in the touch panel mode. In step 822, the main control unit 21 sends the input data to the communication control unit 24 which will transfer the data to the host computer 30 through the communication medium 29. Finally, in step 823, the user receives a specification slip and the his card from the slip unit 26 and the card unit 25, respectively. If there is change, in step 824, the user receives the change from the cash inlet/outlet mechanism 27. Thus, the transaction operation will be completed.

In accordance with this embodiment, in the transaction operation requiring a series of data inputting operations, the data inputting mode can be automatically changed so that each of operations is performed easily and smoothly. A user can therefore easily and efficiently use an ATM.

Additionally, it should be noted that a terminal unit can be provided with plural display devices; in this case, a touch sensor and a sensor panel for character input can be superposed on each of different display devices.

Furthermore, in the steps 809 and 810 of FIG. 10, the financial institution can be input in a second language (e.g. English or Japanese). In this case, software for recognizing the second language and a data file for corresponding the institution written in the second language to that in native language are required. It is desirable that in the case where the user inputs an initial character of the institution or a few subsequent characters thereto in second language character recognition mode, the main control unit 21 selects one or more institutions on the basis of stored software and shows them in the two language on the display 22. The user then easily selects the exact institution from the displayed choices.

Although the present invention has been described in detail, it should be understood that various changes, substitutions and alterations can be made hereto without departing from spirit and scope of the present invention as defined by the appended claims.

We claim:

1. An automatic teller machine (ATM) comprising:
a display;
first input means partially or wholly superposed on said display, said first input means outputting a first signal on the basis of whether a first area previously registered in accordance with the contents displayed on said display has been touched by a user;
second input means partially or wholly superposed on said display, said second input means recognizing symbols such as characters drawn on a second area previously registered thereby to produce a second signal;
processing means for processing a transaction on the basis of said first or second signal; and
selecting means for selecting one of said first and said second input means to supply the signal from the selected input means to said processing means in accordance with a direction for selecting one of said first and said second input means input by an individual user.

2. An automated teller machine according to claim 1, further comprising:
storage means for storing relationship data between the user and said input means, wherein said selecting means determines and selects the input means corresponding to the user on the basis of the data contents stored in said storage means.

3. An automated teller machine according to claim 1, further comprising:
means for designating said input means to be selected by said selecting means.

4. An automated teller machine according to claim 3, wherein said designating means uses said first or said second input means.

5. An automated teller machine according to claim 3, wherein said designating means comprises a user's card in which designation information of the input means is stored and means for reading the designation information from said card.

6. An automatic teller machine (ATM) comprising:
a display;
first input means partially or wholly superposed on said display, said first input means outputting a first signal on the basis of whether a first area previously registered in accordance with the contents displayed on said display has been touched by a user;
second input means partially or wholly superposed on said display, said second input means recognizing symbols such as characters drawn on a second area previously registered thereby to produce a second signal;

processing means for processing a transaction on the basis of said first or second signal;

selecting means for selecting one of said first and said second input means to supply the signal from the selected input means to said processing means in accordance with a direction for selecting one of said first and said second input means input by an individual user; and designating means for designating said input means to be selected by said selecting means, wherein said designating means comprises the individual user's card in which said designating information of the input means is stored and means for reading the designating information from said card.

7. An automated teller machine according to claim 6, wherein said designating means uses said first or said second input means.

8. A data inputting and processing system comprising:

a display;

first input means partially or wholly superposed on said display, said first input means outputting a first signal on the basis of whether a first area previously registered in accordance with the contents displayed on said display has been touched by a user;

second input means partially or wholly superposed on said display, said second input means recognizing symbols such as characters drawn on a second area previously registered thereby to produce a second signal;

processing means for processing a transaction on the basis of said first or second signal; and selecting means for selecting one of said first and said second input means to supply the signal from the selected input means to said processing means in accordance with a direction for selecting one of said first and said second input means input by an individual user.

9. A data inputting and processing system comprising:

a display;

first input means partially or wholly superposed on said display, said first input means outputting a first signal on the basis of whether a first area previously registered in accordance with the contents displayed on said display has been touched by a user;

second input means partially or wholly superposed on said display, said second input means recognizing symbols such as characters drawn on a second area previously registered thereby to produce a second signal;

processing means for processing a transaction on the basis of said first or second signal;

selecting means for selecting one of said first and said second input means to supply the signal from the selected input means to said processing means in accordance with a direction for selecting one of said first and said second input means input by an individual user; and means for designating said input means to be selected by said selecting means, wherein said designating means comprises a user's card in which said designating information of the input means is stored and means for reading the designating information from said card.

* * * * *